United States Patent
Dorenbosch (10) Patent No.: US 6,198,406 B1
(45) Date of Patent: Mar. 6, 2001

(54) METHOD AND APPARATUS FOR PROVIDING A PREDICTABLE UPPER BOUND FOR A CHANNEL SEARCH TIME OF A PORTABLE SUBSCRIBER UNIT

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/023,143

(22) Filed: Feb. 12, 1998

(51) Int. Cl.$^7$ .................................................. H01H 67/00
(52) U.S. Cl. ................ 340/825.03; 455/434; 340/825.44
(58) Field of Search ......................... 340/825.03, 825.04, 340/825.44, 825.51; 455/461, 434, 515

(56) References Cited

U.S. PATENT DOCUMENTS 5,652,783 * 7/1997 Keba et al. ........................ 370/313

5,682,147 * 10/1997 Eaton et al. ..................... 340/825.02

* cited by examiner

Primary Examiner—Michael Horabik
Assistant Examiner—M Shimizu
(74) Attorney, Agent, or Firm—R. Louis Breeden (57) ABSTRACT

A portable subscriber unit (PSU) (222) operating in a plurality of messaging systems selects (605) a first messaging system to monitor for messages. The PSU then initiates (610) background scanning according to a scan list (326), including a plurality of system parameters ranked by appropriateness for the PSU, at a rate not slower than the rate established by a predetermined set of rules known to a controller (212) which sends the messages to the portable subscriber unit, in an attempt to find a system identifier identifying a second messaging system more appropriate for the PSU than the first messaging system. The PSU concurrently monitors (618) the first messaging system for receiving messages until identifying the second messaging system.

18 Claims, 6 Drawing Sheets

PRIOR ART

METHOD AND APPARATUS FOR PROVIDING A PREDICTABLE UPPER BOUND FOR A CHANNEL SEARCH TIME OF A PORTABLE SUBSCRIBER UNIT

FIELD OF THE INVENTION

This invention relates in general to messaging systems, and more specifically to a method and apparatus for providing a predictable upper bound for a channel search time of a portable subscriber unit.

BACKGROUND OF THE INVENTION

Until recently, most one-way pager users either had service in a single simulcast area or had nationwide service. For the first type of service, messages are simulcast from a single group of transmitters. For nationwide service the messages are replicated on all simulcast areas across the nation. Obviously, nationwide service is very expensive for the service providers.

Recently, "Follow Me Roaming" (FMR) has become available. Under FMR, the user normally has service in only one simulcast area, i.e. the user's "home" area. When the user plans to travel outside the home area, he notifies the service provider of his planned itinerary, including departure and arrival times so that his messages can follow him.

FMR is becoming the method of choice by the service providers for providing nationwide coverage, because messages do not have to be sent in all coverage areas. They just have to be sent to the area where the user is. The most thoughtfully implemented FMR systems operate with an "overlap interval" around the departure and arrival times. During the overlap interval, messages are replicated both in the area being departed and in the arrival area. This is done to provide a "grace period" having upper and lower limits for accommodating temporal variations in the departure and arrival times. Additional time generally is put into the upper limit of the overlap interval to accommodate uncertainty in the channel search time required for the pager to find a new messaging system in each arrival area.

Uncertainty in the channel search time occurs because prior art subscriber units do not search for a new system until they lose the signal from a currently received system. Because system coverage areas can overlap, it is possible for a subscriber unit that has visited, for example, a second system adjacent to the home system to remain locked to the second system for a long time—possibly hours or days— after the subscriber unit has returned to the home area. If message replication is halted before the subscriber unit has switched back to the home area, messages transmitted only in the home area will be missed. On the other hand, message replication costs air time, causing the service provider to want to keep message replication time as short as possible.

A related problem affects a prior art two-way subscriber unit which has switched to one-way operation with a one-way system, due to the unavailability of a usable two-way system. If the subscriber unit remains within range of the one-way system, it may not search for a more appropriate two-way system for a long time, even when a usable two-way system becomes available.

Thus, what is needed is a method and apparatus for providing a predictable upper bound for a channel search time during which a portable subscriber unit searches for a more appropriate system for its message delivery. The method and apparatus preferably will allow the portable subscriber unit to find the more appropriate system even when monitoring a currently selected system, and without missing any messages.

SUMMARY OF THE INVENTION

An aspect of the present invention is a method in a plurality of messaging systems for providing a predictable upper bound for a channel search time of a portable subscriber unit. The method comprises in the portable subscriber unit the steps of selecting a first messaging system to monitor for messages; and initiating background scanning in accordance with a scan list, comprising a plurality of system parameters ranked by appropriateness for the portable subscriber unit, at a rate not slower than the rate established by a predetermined set of rules known to a controller which sends the messages to the portable subscriber unit, in an attempt to find a system identifier identifying a second messaging system more appropriate for the portable subscriber unit than the first messaging system. The method further comprises the step of concurrently monitoring the first messaging system for receiving messages until identifying the second messaging system.

Another aspect of the present invention is a portable subscriber unit operating in a plurality of messaging systems for providing a predictable upper bound for a channel search time. The portable subscriber unit comprises a receiver for receiving messages and control information, and a processing system coupled to the receiver for controlling the receiver and for processing the messages and control information. The processing system is programmed to select a first messaging system to monitor for messages, and to initiate background scanning in accordance with a scan list, comprising a plurality of system parameters ranked by appropriateness for the portable subscriber unit, at a rate not slower than the rate established by a predetermined set of rules known to a controller which sends the messages to the portable subscriber unit, in an attempt to find a system identifier identifying a second messaging system more appropriate for the portable subscriber unit than the first messaging system. The processing system is further programmed to concurrently monitor the first messaging system for receiving messages until identifying the second messaging system.

Another aspect of the present invention is a controller in a messaging system of a plurality of messaging systems for providing a predictable upper bound for a channel search time of a portable subscriber unit assigned to the controller. The controller comprises a network interface for receiving a message from a message originator and for conducting communications with others of the plurality of messaging systems, and a processing system coupled to the network interface for processing the message and the communications. The controller further comprises a base station interface coupled to the processing system for controlling a base station. The processing system is programmed to control the base station to transmit, during a plurality of predetermined time periods, a system identifier. The processing system is further programmed with information about a scan list in the portable subscriber unit, comprising a plurality of system parameters ranked by appropriateness for the portable subscriber unit, and with information defining for the portable subscriber unit a predetermined set of rules by which the portable subscriber unit initiates background scanning. The processing system is further programmed to cooperate with others of the plurality of messaging systems, with regard to message delivery to the portable subscriber unit, in accordance with the information about said scan list and said predetermined set of rules, thereby providing said predictable upper bound for the channel search time.

DETAILED DESCRIPTION OF THE DRAWINGS

Figure 1:
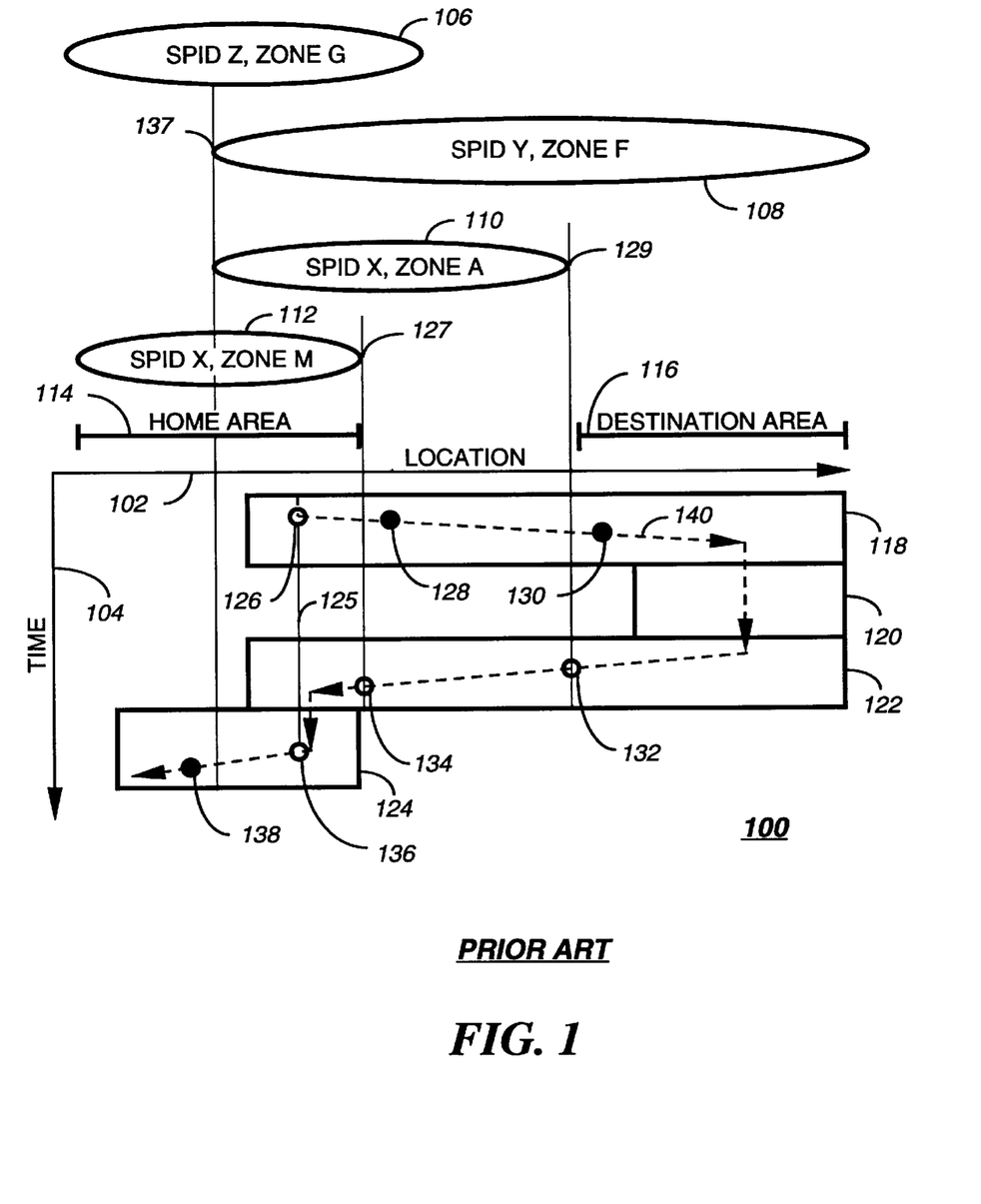
FIG. 1 is a diagram depicting coverage areas of a plurality of prior art messaging systems and a channel search behavior of a prior art portable subscriber unit operating therein.

Referring to FIG. 1, a diagram 100 depicts coverage areas 106, 108, 110, 112 of a plurality of prior art messaging systems and a channel search behavior of a prior art portable subscriber unit operating therein. The horizontal axis 102 represents location with regard to the entire diagram 100, while the vertical axis 104 represents time with regard to only the portion of the diagram 100 below the horizontal axis. Coverage areas 106, 108, 110, 112 periodically broadcast their corresponding service provider identification (SPID) and zone identification. The subscriber unit is assigned to a home area 114 and plans to travel to a destination area 116. The user of the subscriber unit submits an itinerary to the service provider, indicating the time periods 118, 120, 122, 124 during which the user plans, respectively, to be en route to the destination, at the destination, en route home, and at home. A dashed line depicts a path 140 through space and time taken by the user. A scan list controls the zone selection behavior of the subscriber unit both at home and when it roams away from home. An exemplary scan list for the subscriber unit is as follows:

| | |
|---|---|
| SPID X, ZONE M, FREQ 1 | (MOST APPROPRIATE) |
| SPID X, ANY ZONE, FREQ 2 | : |
| SPID Y, ANY ZONE, FREQ 3 | (LEAST APPROPRIATE), | where SPID refers to the service provider's identification.

The user's journey begins at his home location 125, at the starting point 126, where upon power up the subscriber unit has selected ZONE M, the home zone, i.e., the zone at the top of the scan list. As the journey proceeds along the path 140, the subscriber unit passes beyond the coverage of ZONE M at a first location 127. In response to losing the signal, the subscriber unit begins scanning other frequencies in accordance with its scan list and soon finds SPID X, ZONE A, which the subscriber unit then selects for monitoring at a first en route point 128. As the journey continues, the subscriber unit passes beyond the coverage of ZONE A at a second location 129. In response to losing the signal, the subscriber unit begins scanning other frequencies in accordance with its scan list, first searching FREQ 1 for ZONE M, then FREQ 2 for any other SPID X zone, then FREQ 3 for SPID Y, and soon finds SPID Y, ZONE F. The subscriber unit then selects ZONE F for monitoring at a second en route point 130 and continues to monitor ZONE F while in the destination area.

The zone selection behavior of the subscriber unit has been reasonably predictable throughout the first portion of the journey described above. Given a reasonably accurate itinerary, the times at which the scriber unit will select and monitor ZONE A and then ZONE F can be determined by the home controller of the subscriber unit, thereby minimizing the times during which messages have to be replicated in both ZONE M and ZONE A, and later in ZONE A and ZONE F to assure reception by the subscriber unit.

Unfortunately, the zone selection behavior of the subscriber unit during the next portion of the journey representing the return home is not so predictable. Note that at a third en route point 132 the subscriber unit enters the coverage of the more appropriate ZONE A. The subscriber unit, however, does not switch back to ZONE A, because it has not lost the signal from ZONE F. Of course, the user could power down and then power up the subscriber unit, which would force a scan in accordance with the scan list and achieve the selection of ZONE A. Such an action on the part of the user is probably not likely, and in any event is unpredictable. Even worse, when the subscriber unit reaches ZONE M, the home coverage area, at a fourth en route point 134 and continues to a fifth en route point 136 located at his home location 125, the subscriber unit is still monitoring ZONE F for messages. The subscriber unit will continue to monitor ZONE F for an unpredictable time, unless the user powers down and then powers up the subscriber unit after reaching ZONE M, or the subscriber unit travels beyond the coverage of ZONE F as depicted by the sixth en route point 138, where the subscriber unit will scan and find ZONE M.

An undesirable side effect of the unpredictable zone selection behavior of the prior art subscriber unit is that messages for the subscriber unit must be replicated in multiple zones for a lengthy time period to ensure that the messages are not missed by the subscriber unit. In the above example, message replication is required in ZONE F, ZONE A, and ZONE M during the portion of the journey representing the return home, and for hours or days after the return home to avoid missed messages. As noted in the Background of the Invention herein above, what is needed is a method and apparatus for providing a predictable upper bound for a channel search time during which a portable subscriber unit searches for a more appropriate system for its message delivery.

Figure 2:
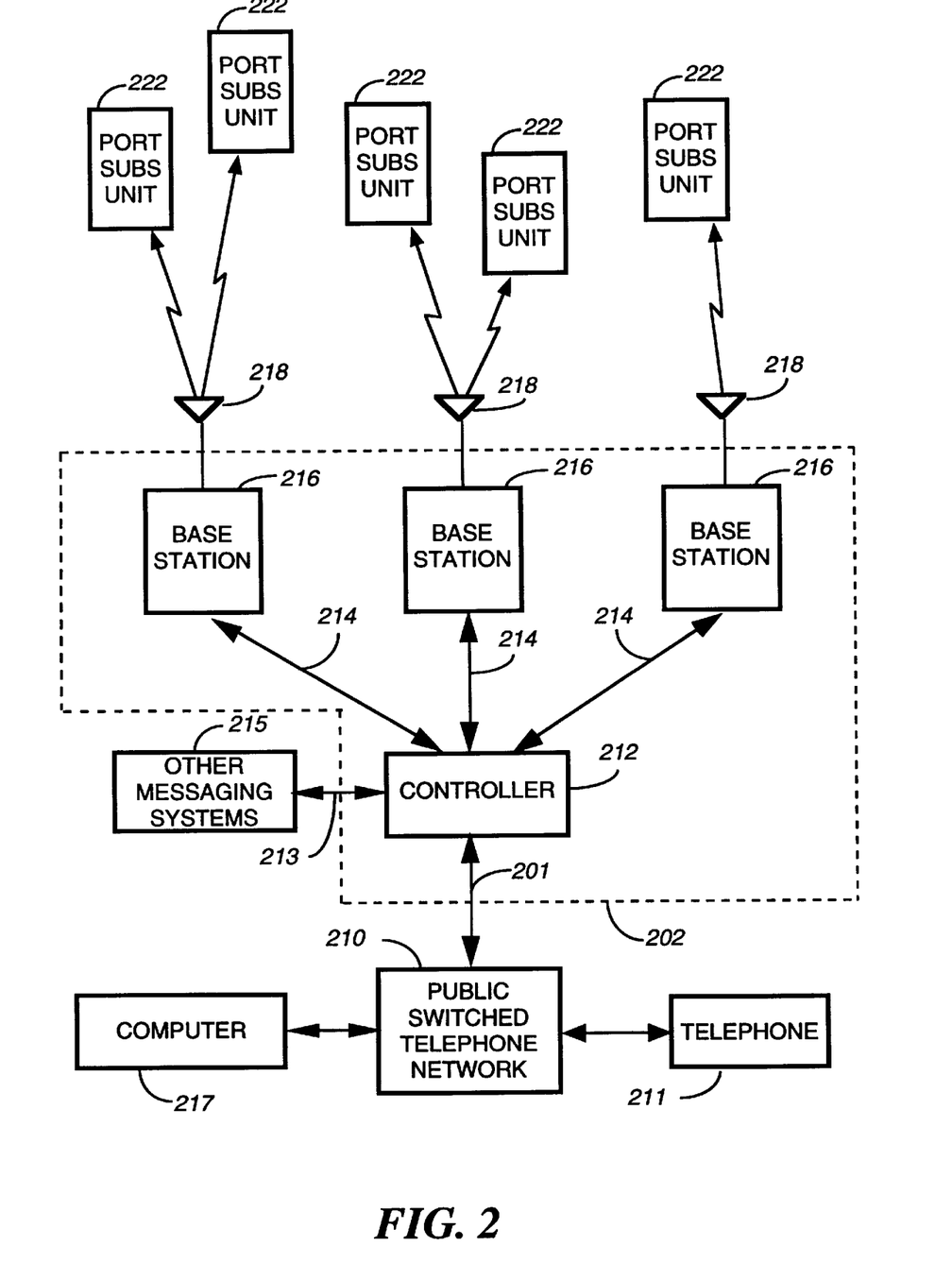
FIG. 2 is an electrical block diagram of a messaging system in accordance with the present invention.

Referring to FIG. 2, an electrical block diagram depicts an exemplary one-way messaging system in accordance with the present invention, comprising a fixed portion 202 including a controller 212 and a plurality of base stations 216, the messaging system also including a plurality of portable subscriber units 222. The base stations 216 preferably communicate with the subscriber units 222 utilizing conventional radio frequency (RF) techniques, and are coupled by communication links 214 to the controller 212, which controls the base stations 216.

The hardware of the controller 212 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 216 is preferably the RF-Orchestra! transmitter and can include, in two-way messaging systems, the RF-Audience!™ receiver manufactured by Motorola, Inc. The subscriber units 222 are preferably similar to the Advisor Gold™ and Pagefinder™ messaging units, also manufactured by Motorola, Inc., and having software modified in accordance with the present invention. It will be appreciated that other similar hardware can be utilized as well for the controller 212, the base stations 216, and the portable subscriber units 222.

Each of the base stations 216 transmits RF signals to the portable subscriber units 222 via an antenna 218. The RF signals transmitted by the base stations 216 to the subscriber units 222 (outbound messages) comprise selective call addresses identifying the portable subscriber units 222, and voice and data messages originated by a caller, as well as commands originated by the controller 212 for adjusting operating parameters of the radio communication system.

The controller 212 preferably is coupled by telephone links 201 to a public switched telephone network (PSTN) 210 for receiving selective call message originations therefrom. Selective call originations comprising voice and data messages from the PSTN 210 can be generated, for example, from a conventional telephone 211 or a conventional computer 217 coupled to the PSTN 210. It will be appreciated that, alternatively, other types of communication networks, e.g., packet switched networks, the Internet, and local area networks, can be utilized as well for transporting originated messages to the controller 212. The controller 212 also is preferably coupled to other messaging systems 215, to form a plurality of messaging systems, through a communication link 213 for sending a message via the other messaging systems 215 in accordance with the present invention, as described further below.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well. It will be further appreciated that, while the preferred embodiment for practicing the present invention is a one-way messaging system, the present invention is applicable also to a two-way messaging system.

Figure 3:
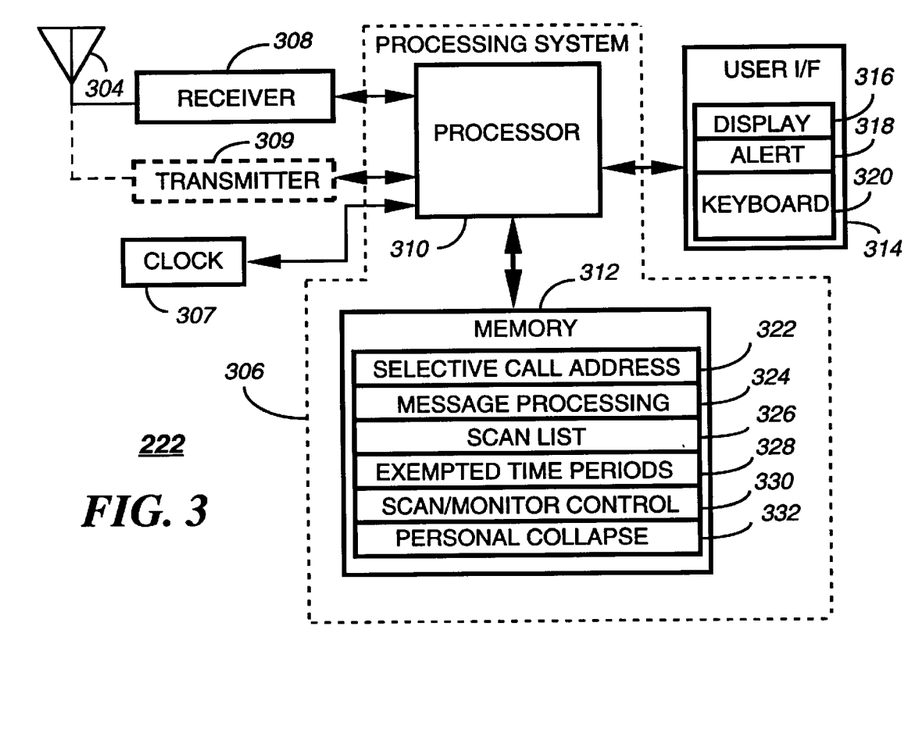
FIG. 3 is an electrical block diagram of a portable subscriber unit in accordance with the present invention.

FIG. 3 is an electrical block diagram of an exemplary portable subscriber unit 222 in accordance with the present invention. The subscriber unit 222 comprises an antenna 304 for intercepting an outbound message and (optionally) for transmitting an inbound message to a base receiver (not shown). The antenna 304 is coupled to a conventional receiver 308 for receiving the outbound message and, optionally, is coupled to a conventional transmitter 309 for transmitting the inbound message. The receiver 308 and the (optional) transmitter 309 are coupled to a processing system 306 for processing the outbound messages and for controlling the subscriber unit 222 in accordance with the present invention. A user interface 314 preferably is also coupled to the processing system 306 for interfacing with a user. The user interface 314 preferably comprises a conventional display 316 for displaying the inbound and outbound messages, a conventional alert element 318 for alerting the user when the outbound message arrives, and a conventional keyboard 320 for generating the inbound message and for controlling the subscriber unit 222. A conventional clock 307 is also coupled to the processing system 306 for supporting time keeping requirements of the subscriber unit 222.

The processing system 306 comprises a conventional processor 310 and a conventional memory 312. The memory 312 comprises software elements and other variables for programming the processing system 306 in accordance with the present invention. The memory 312 preferably includes a selective call address 322 to which the subscriber unit 222 is responsive. In addition, the memory 312 includes a message processing element 324 for programming the processing system 306 to process messages through well-known techniques. The memory 312 further comprises a scan list 326 comprising a plurality of system parameters, e.g., system provider identification, zone identification, and frequency for identifying systems to be used by the portable subscriber unit 222. The scan list can also include a "no scan" indicator marking selected system parameters, for negating background scanning when the portable subscriber unit 222 is monitoring a system marked with the indicator. The plurality of system parameters are ranked by appropriateness for the portable subscriber unit 222, e.g., parameters at or near the top of the scan list 326 are more appropriate than those further down.

The memory 312 further comprises an exempted time periods element 328 for programming the processing system 306 to define for the portable subscriber unit 222 a plurality of exempted time periods during which the portable subscriber unit 222 is permitted to perform background scanning, in accordance with the scan list 326, for finding and selecting a system more appropriate for the portable subscriber unit 222 than a currently monitored system. Preferably, in defining the exempted time periods, the portable subscriber units 222 are grouped into a plurality of groups, based upon, for example, the selective call address of each of the portable subscriber units 222. Then, the exempted time periods of the portable subscriber units 222 are defined to occur at different times in different ones of the groups. The algorithm for defining the exempted time periods preferably is known to both the portable subscriber units 222 and the controller 212 of each of the plurality of messaging systems, so that the sending of messages to a portable subscriber unit 222 is avoided during the exempted time periods corresponding to the group to which the portable subscriber unit 222 belongs.

At least one of the plurality of exempted time periods coincides with at least one of a plurality of predetermined time periods during which at least some of a plurality of messaging systems transmit a corresponding plurality of system identifiers to identify the plurality of messaging systems to the portable subscriber unit 222. The portable subscriber unit 222 background scans during the at least one of the plurality of predetermined time periods, but also continues concurrently to monitor the currently selected messaging system for receiving messages until finding and selecting a more appropriate messaging system. Here the word "concurrently" means at approximately the same time, e.g., during the same FLEX™ cycle, because background scanning occurs during the exempted time periods, while messages are sent to the portable subscriber unit 222 during times other than the exempted time periods.

The memory further comprises a scan/monitor control element 330 for programming the processing system 306 to control background scanning and message monitoring operations of the portable subscriber unit 222 in accordance with the present invention. The scan/monitor control element 330 preferably programs the processing system 306 to initiate background scanning at a rate determined by how many system parameters of a predetermined kind, e.g., how many frequency parameters, are in the scan list 326. The scan/monitor control element 330 preferably further programs the processing system 306 to use a personal collapse value 332 for the portable subscriber unit 222 that is different from a system collapse value transmitted by the currently selected system of the plurality of messaging systems, and to initiate background scanning at a rate also determined by the personal collapse value 332. In the case of a two-way portable subscriber unit operating in a one-way mode when a currently monitored messaging system does not support two-way communications, the scan/monitor control element 330 preferably further programs the processing system 306 to initiate background scanning to find a more appropriate two-way system in the plurality of messaging systems.

Figure 4:
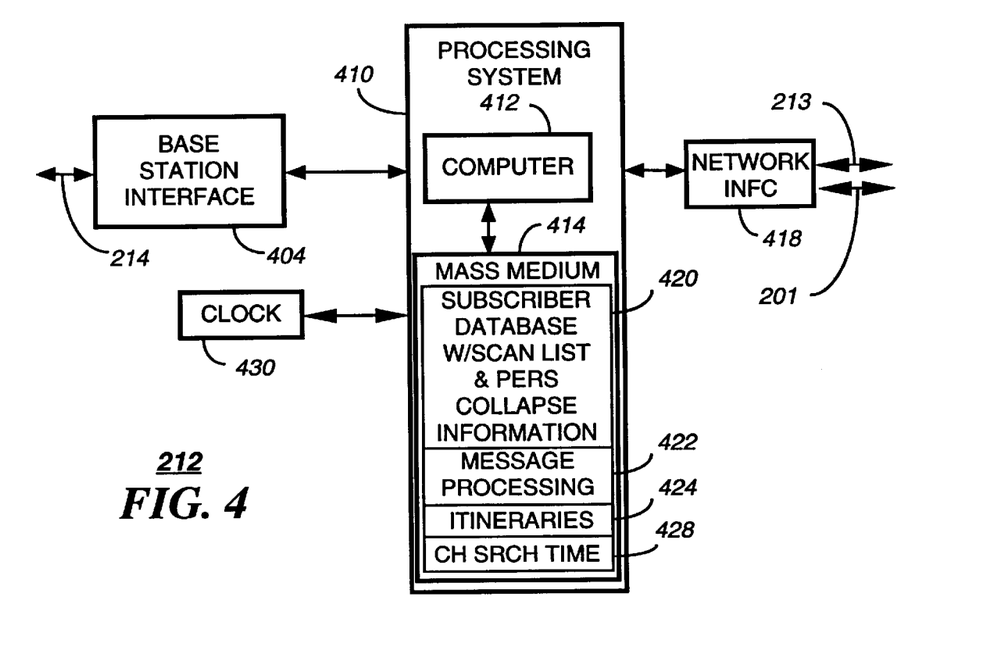
FIG. 4 is an electrical block diagram of a controller in accordance with the present invention.

FIG. 4 is an electrical block diagram depicting an exemplary controller 212 in accordance with the present invention. The controller 212 comprises a network interface 418 for receiving a message from a message originator via the telephone links 201. The network interface 418 also preferably communicates with the other messaging systems 215 via the communication link 213. It will be appreciated that, alternatively, more than one network interface 418 can be utilized, and that different network interfaces 418 can be utilized for receiving the message and for communicating with the other messaging systems 215, respectively.

The network interface 418 is coupled to a processing system 410 for controlling and communicating with the network interface 418. The processing system is coupled to a base station interface 404 for controlling and communicating with the base stations 216 via the communication links 214. The processing system 410 is also coupled to a conventional clock 430 for providing a timing signal to the processing system 410. The processing system 410 comprises a conventional computer 412 and a conventional mass medium 414, e.g., a magnetic disk drive, programmed with information and operating software in accordance with the present invention. The mass medium 414 comprises a subscriber database 420, including information about the scan list 326 and personal collapse value 332 associated with the portable subscriber units 222 assigned to the controller 212, e.g., as their "home" controller. The mass medium 414 also includes a message processing element for processing messages for the portable subscriber units 222 in accordance with the present invention. In particular, the message processing element programs the processing system 410 to disallow transmission of a message addressed to one of the portable subscriber units 222, during the plurality of exempted time periods defined for the portable subscriber unit 222. This is done to prevent the message from being missed while the portable subscriber unit 222 is performing background scanning during one of the exempted time periods. Preferably, the plurality of exempted time periods defined for the portable subscriber unit 222 are calculated from the selective call address of the portable subscriber unit 222, using a predetermined algorithm. It will be appreciated that, alternatively, the plurality of exempted time periods can be defined in some other manner, such as from a table look-up.

The mass medium 414 also includes an itineraries element 424 describing planned itineraries associated with the users of some of the plurality of portable subscriber units 222 assigned to the controller 212. The planned itineraries preferably include travel plan details, such as destination cities, along with planned arrival and departure times. The mass medium 414 further comprises a channel search time element 428 for determining a predictable upper bound for the channel search time during which one of the portable subscriber units 222 will search to select a more appropriate messaging system for its message delivery. The channel search time element 428 preferably programs the processing system 410 to utilize the information about the scan list, the plurality of exempted time periods, and the planned itinerary to predict the upper bound for the channel search time and to reduce a replication of messages for the portable subscriber unit 222 in multiple ones of the plurality of messaging systems when possible, following a change of location by the user as determined from the planned itinerary. In addition, the channel search time element 428 preferably programs the processing system 410 to utilize the personal collapse value information to predict the upper bound for the channel search time for stopping the replication of messages, when the portable subscriber unit 222 uses a personal collapse value 332 that is different from a system collapse value transmitted by the currently selected system of the plurality of messaging systems.

Figure 5:
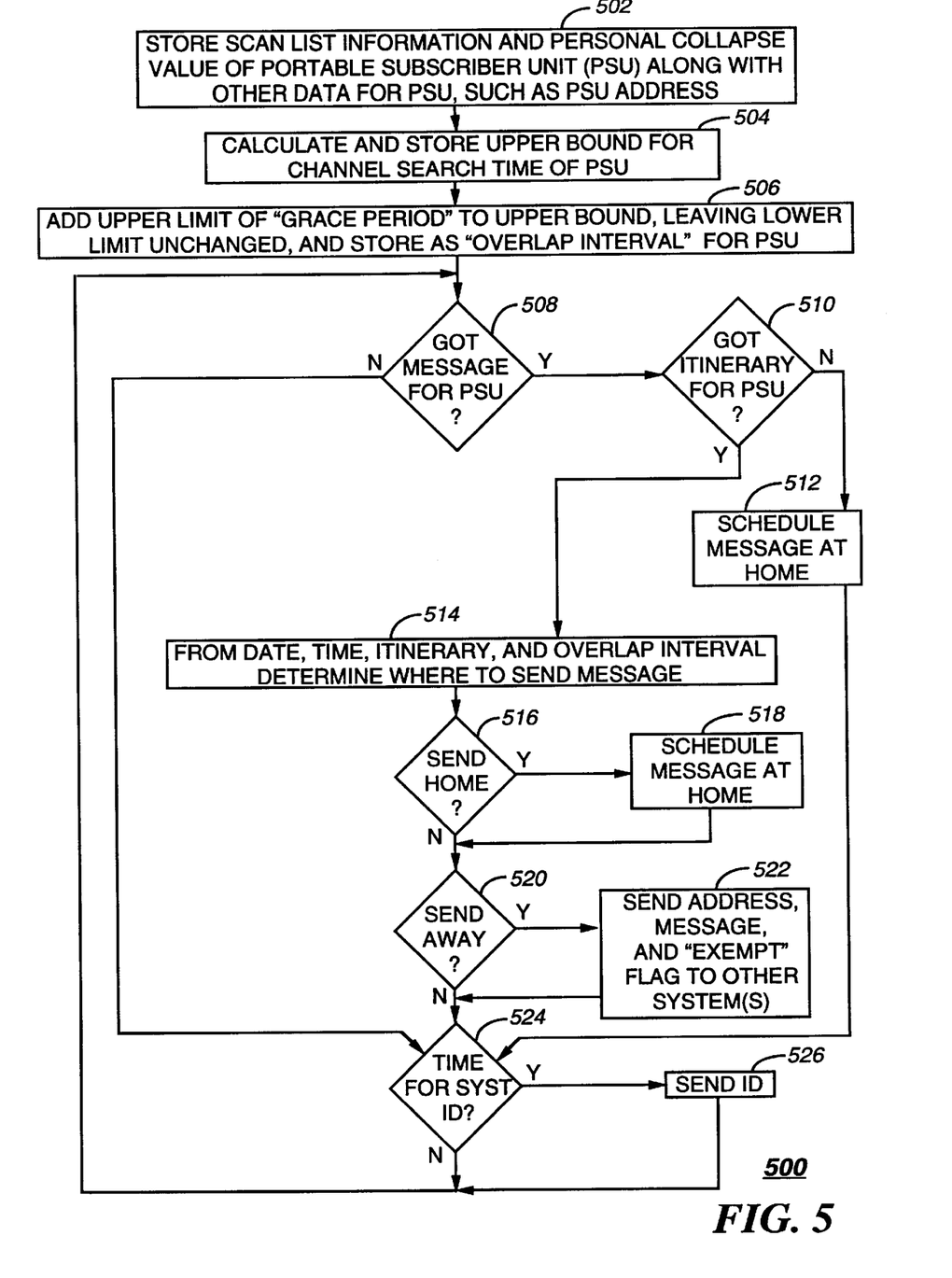
FIG. 5 is a flow diagram depicting operation of the controller which sends messages to the portable subscriber unit, in accordance with the present invention.

FIG. 5 is an exemplary flow diagram 500 depicting operation of the controller 212 which sends messages to the portable subscriber unit 222, e.g., the home controller, in accordance with the present invention. First, the processing system 410 stores 502 information about the scan list 326, e.g., the number of different frequencies in the scan list, and the personal collapse value 332, for the portable subscriber units 222 assigned to the controller 212. This information preferably is kept along with other data, such as selective call addresses of the subscriber units 222, in the subscriber database 420. Next, the processing system 410 preferably calculates and stores 504 an upper bound for the channel search time of each of the portable subscriber units 222, as described herein above, from the information stored in step 502. To cite a specific example, when the messaging system operates using Motorola's well-known FLEX™ One-way Messaging Protocol, each cycle of 128 data frames requires four minutes to transmit. Adopting rules, for example, that require the subscriber unit 222 to initiate background scanning at least once per cycle, provides a predictable upper bound of $$4 \times (N_f - 1) \text{ minutes}$$

for finding a more appropriate system, where $N_f$ is the number of frequencies in the scan list of the subscriber unit 222. If a subscriber unit 222 has, for example, eight frequencies in its scan list, then the predictable upper bound for the channel search time would be 28 minutes.

The processing system 410 then adds 506 the upper limit, e.g., +30 minutes, of a predetermined "grace period," (for accommodating temporal variations in the departure and arrival times) to the upper bound calculated for each subscriber unit, while leaving the lower limit, e.g., −30 minutes, of the grace period unchanged, and stores the values as the "overlap interval" for each subscriber unit 222. For this example, the overlap interval is −30 minutes, +58 minutes. This is the amount of time during which message replication preferably will be performed before and after the planned itinerary indicates a traveling subscriber unit 222 will move between zones having different levels of appropriateness for the subscriber unit 222. (The reason the lower limit of the grace period is left unchanged is because the lower bound of the channel search time occasionally can be quite small, e.g., less than 1 second, under some circumstances. In other words, one cannot "depend" upon the channel search time extending to the upper bound every time.)

Next, the processing system 410 checks 508 whether it has received a message for one of the portable subscriber units 222. If not, the processing system 410 checks 524 whether a predetermined time period has arrived for transmitting a system identifier for identifying the messaging system to the portable subscriber units 222. If so, the processing system 410 sends 526 the system identifier and returns to step 508 to check for a message. If not, the processing system 410 simply returns to step 508 to check for a message.

At step 508, when the processing system 410 determines that a message exists for one of the portable subscriber units 222, then the processing system 410 checks 510 whether the portable subscriber unit 222 has an associated itinerary stored in the itineraries element 424, indicating that the portable subscriber unit may be traveling. If not, the processing system 410 schedules 512 the message for transmission by the home system. Flow then returns to step 524 to see if the time has arrived to transmit the system identifier. If at step 510 the processing system 410 does find an associated itinerary, then the processing system 410 determines 514 from the itinerary, the current date and time, and the overlap interval, where to send the message.

For example, if the current date and time are Jan. 30, 1998, and 1 PM; the itinerary indicates a zone transition from ZONE K to ZONE L scheduled for Jan. 30, 1998 at 1:15 PM; and the overlap interval is −30 minutes, +58 minutes, then the replication time period for sending the message in both ZONE K and ZONE L is from 12:45 PM to 2:13 PM on Jan. 30, 1998. The current date and time fall within the replication time period, and the processing system 410 thus will send the message to both the ZONE K system and the ZONE L system.

At step 516 the processing system 410 checks whether step 514 has determined that it should send the message at home. If so, the processing system 410 schedules 518 the message for transmission by the home system. In any case, the processing system 410 also checks 520 whether it should send the message to additional other messaging system(s). If so, the processing system 410 sends 522 the selective call address of the portable subscriber unit 222 for which the message is intended, the message, and an "exempt" flag to the other messaging system(s). The exempt flag indicates that the receiving other messaging systems should disallow transmission of the message to the portable subscriber unit 222 during the plurality of exempted time periods defined for the portable subscriber unit 222 in accordance with the present invention. In any case, flow then proceeds to step 524 to see, as before, whether the time for system identification has arrived.

Figure 6:
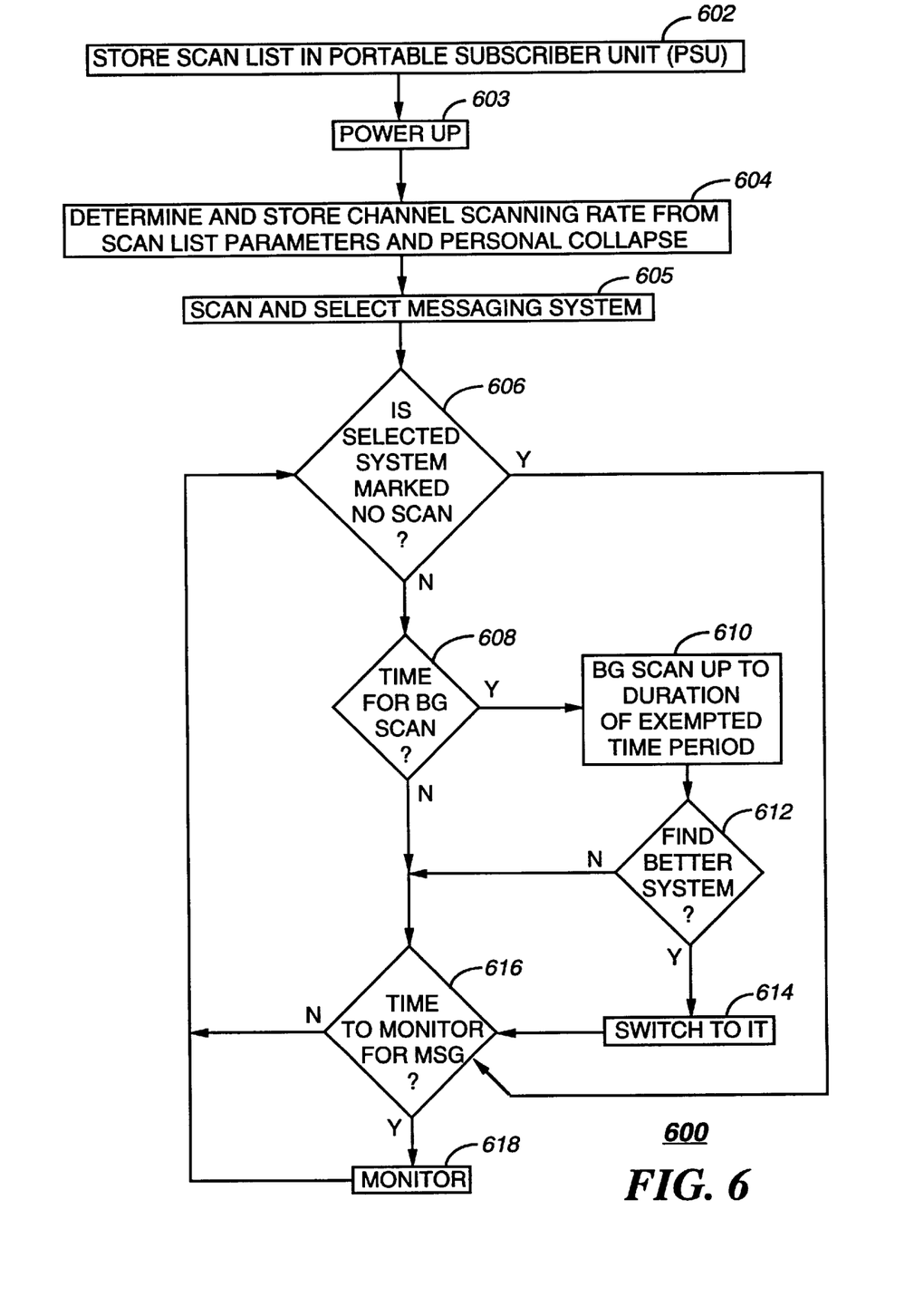
FIG. 6 is a flow diagram depicting operation of the portable subscriber unit in accordance with the present invention.

FIG. 6 is an exemplary flow diagram 600 depicting operation of the portable subscriber unit 222 in accordance with the present invention. First, the scan list 326 is stored in the memory 312. This preferably is done at the factory during manufacture of the portable subscriber unit 222. Alternatively, the scan list 326 can be programmed in the field, or over the air. Next, the portable subscriber unit 222 is powered up 603. In response, the processing system 306 preferably determines and stores 604 in the memory 312 a channel scanning rate to be used for background scanning. It will be appreciated that, alternatively, the channel scanning rate can be programmed by the factory, in the field, or over-the-air, as well.

To diverge briefly, the channel, ie., background, scanning rate preferably is determined from a predetermined set of rules known to a controller 212 which sends messages to the portable subscriber unit 222, e.g., the home controller of the portable subscriber unit 222. The rules are such that the maximum time to complete the channel search preferably is determined by, i.e., increases with, the number of frequency parameters in the scan list 326 in a well-defined manner. To conserve battery power, it is also preferable that background scanning does not dominate power consumption. This implies that the maximum time to complete the channel search is further determined by, i.e., increases with, the personal collapse value 332 of the portable subscriber unit 222 in a well-defined manner. A preferred relationship between the number of frequency parameters in the scan list 326 and the personal collapse value 332 of the portable subscriber unit 222, and the upper bound for the channel search time (in cycles) in a system using the FLEX™ family of protocols is as follows:

$$UB_{CST} = \left(ROUNDUP\left(\frac{nf}{16} + \frac{nf}{2}\right)\right) \times MAX(1, 2^{(pgrc-2)}),$$

where nf is the number of frequencies in the scan list 326, and pgrc is the personal collapse value 332 of the portable subscriber unit 222. (The reason for the ROUNDUP function is to ensure that all of the exempted time periods, which are not uniformly distributed throughout the cycle, are available for the background scan, no matter where in the cycle the background scan begins.)

A next background scan is not initiated before an ongoing background scan completes. The maximum background scanning rate is thus defined as the inverse of the upper bound for the channel search time:

$$SR_{MAX} = \frac{1}{UB_{CST}}.$$

Referring again to FIG. 6, the processing system 306 next scans 605 a set of radio frequencies, using well-known techniques in accordance with the scan list 326, to find and select a suitable messaging system to monitor for messages. The processing system 306 then checks 606 whether the selected system, i.e., the system currently monitored by the portable subscriber unit 222 for receiving messages, is marked by an indicator as a "no scan" system. This can be determined, for example, from a scan list entry such as the following:

SPID X, ZONE R, FREQ 1, NO SCAN.

If the system is so marked, the processing system 306 skips the background scanning process and proceeds to step 616 to check whether the time has arrived for monitoring the currently selected system for a message. Background scanning is skipped to save battery whenever it is known a priori that while monitoring certain systems the portable subscriber unit 222 could never find a more appropriate system. For example, if the most preferred system is Dallas, Tex. and the next preferred system is New York, the portable subscriber unit 222 does not need to perform background scanning while in New York, because the portable subscriber unit 222 will not be able to receive Dallas from New York.

If, on the other hand, at step 606 the selected system is not marked as a "no scan" system, then the processing system 306 checks 608 whether the time has arrived for a background scan, in accordance with the scan rate of the portable subscriber unit 222, the positions of the exempted time periods of the portable subscriber unit 222, and the timing signals of the portable subscriber unit 222. If so, the portable subscriber unit 222 background scans 610 in accordance with its scan list 326 up to the duration of the exempted time period. If, during the scan, the portable subscriber unit 222 finds 612 a more appropriate system, then the processing system 306 selects 614 the more appropriate system as the currently selected system to monitor for its messages. Then the processing system 306 checks 616 whether the time has arrived for monitoring the currently selected system for a message. If, on the other hand, in step 612 the portable subscriber unit 222 does not find a more appropriate system, then the processing system 306 simply checks 616 whether the time has arrived for monitoring the currently selected system for a message. If so, the processing system 306 monitors 618 the selected system for a message and then returns to step 606 to check whether the selected system is marked as a "no scan" system. If, on the other hand, at step 616 it is not time to monitor for a message, the processing system 306 simply returns to step 606 to check whether the selected system is marked as a "no scan" system.

Figure 7:
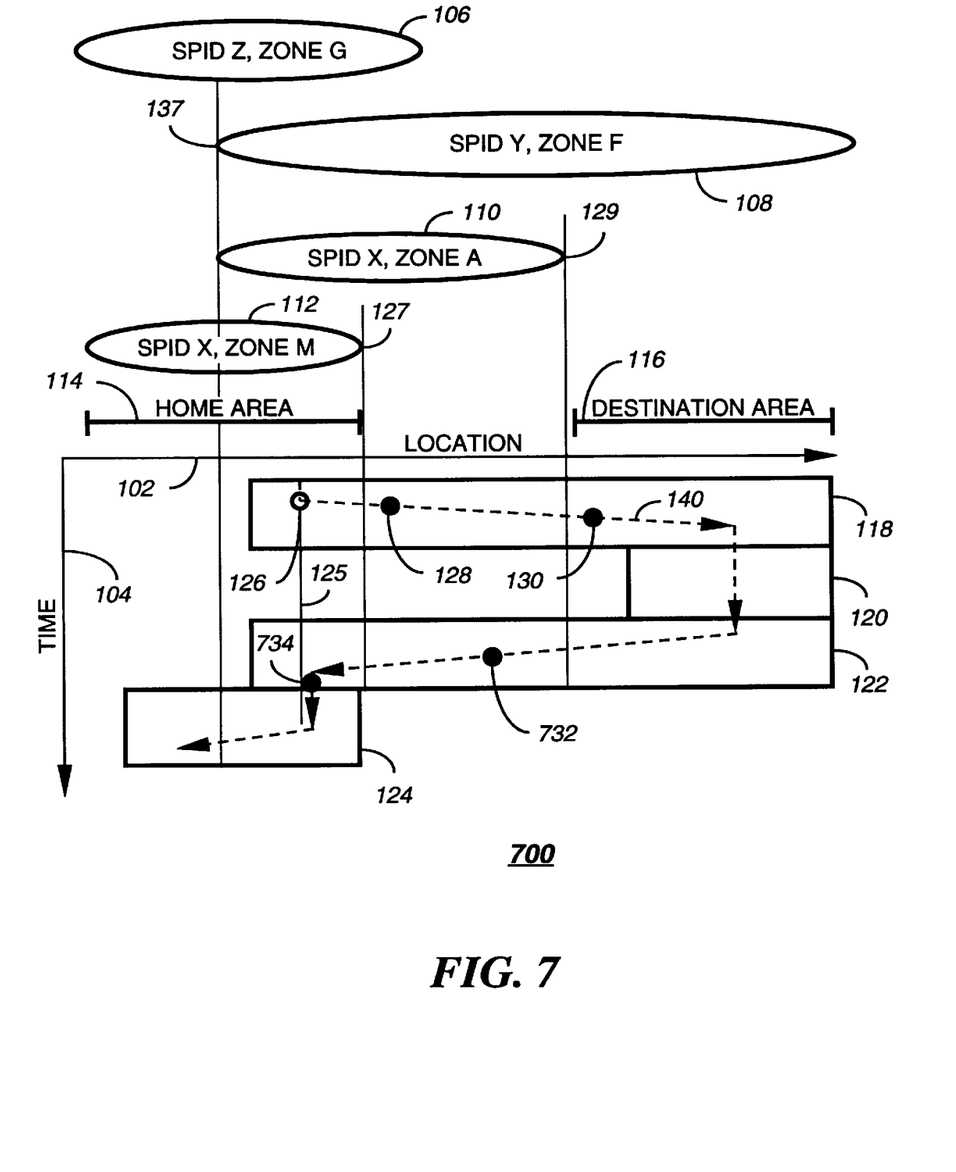
FIG. 7 is a diagram depicting coverage areas of a plurality of messaging systems and channel search behavior of the portable subscriber unit operating therein in accordance with the present invention.

FIG. 7 is a diagram 700 depicting coverage areas 106, 108, 110, 112 of a plurality of messaging systems and channel search behavior of the portable subscriber unit 222 operating therein in accordance with the present invention. The diagram 700 is similar to the diagram 100, the essential difference being that the channel search behavior that occurs in the diagram 700 in accordance with the present invention during the return portion of the journey from the destination area is advantageously superior to the channel search behavior of the prior art diagram 100. As before, the scan list of the example subscriber unit is as follows:

| | |
|---|---|
| SPID X, ZONE M, FREQ 1 | (MOST APPROPRIATE) |
| SPID X, ANY ZONE, FREQ 2 | : |
| SPID Y, ANY ZONE, FREQ 3 | (LEAST APPROPRIATE). |

Note that on the return portion of the journey, when in time period 122 the portable subscriber unit 222 reenters the coverage area 110 of ZONE A from ZONE F (at location 129), background scanning, in accordance with the present invention, soon detects the more appropriate SPID X, and the portable subscriber unit 222 advantageously switches its message monitoring to ZONE A at, for example, an en route point 732. The switching occurs even though the portable subscriber unit 222 is still well within the coverage area 108 of the less appropriate ZONE F at the time. Similarly, when the portable subscriber unit 222 reenters the coverage area 112 of ZONE M (the home zone) from ZONE A (at location 127), background scanning soon detects the more appropriate ZONE M, and the portable subscriber unit 222 advantageously switches its message monitoring to ZONE M at, for example, an en route point 734. The switching occurs even though the portable subscriber unit 222 is still well within the coverage areas 108, 110 of the less appropriate ZONE F and ZONE A at the time. Because the background scanning is performed in accordance with a set of rules known by the home controller of the portable subscriber unit 222, the upper bound of the background scanning, i.e., channel search, time is predictable by the home controller; and message replication in the multiple messaging systems advantageously can be reduced, thereby saving air time.

It is interesting to note that, while background scanning in accordance with the present invention is very important to one-way portable subscriber units for reducing the need for message replication, background scanning is also of importance to two-way portable subscriber units. This is because two-way units are sometimes forced to operate in a one-way mode, due to the unavailability of a suitable two-way system. When operating in a one-way mode, a two-way unit in accordance with the present invention preferably will initiate background scanning to find and select a more appropriate two-way system in the plurality of messaging systems.

Thus, it should be clear from the preceding disclosure that the present invention provides a method and apparatus that allows a predictable upper bound for a channel search time during which a portable subscriber unit searches for a more appropriate system for its message delivery. The method and apparatus advantageously allows the portable subscriber unit to find the more appropriate system even when monitoring a currently selected system, and without missing any messages.

Many modifications and variations of the present invention are possible in light of the above teachings. Thus, it is to be understood that, within the scope of the appended claims, the invention can be practiced other than as described herein above.

What is claimed is:

1. A method in a plurality of messaging systems for providing a predictable upper bound for a channel search time of a portable subscriber unit, the method comprising in the portable subscriber unit the steps of:

selecting a first messaging system to monitor for messages;

initiating background scanning in accordance with a scan list, comprising a plurality or system parameters ranked by appropriateness for the portable subscriber unit, at a rate not slower than the rate established by a predetermined set of rules known to a controller which sends the messages to the portable subscriber unit, in an attempt to find a system identifier identifying a second messaging system more appropriate for the portable subscriber unit than the first messaging system; and concurrently monitoring the first messaging system for receiving messages until identifying the second messaging system, and the method further comprising in a fixed portion of at least some of the plurality of messaging systems the step of transmitting, during a plurality of predetermined time periods, a corresponding plurality of system identifiers, and wherein the initiating step comprises the step of initiating background scanning during at least one of a plurality of exempted time priods coinciding with at least one of the plurality of predetermined time periods.

2. The method of claim 1, wherein the initiating step comprises the step of initiating background scanning at a rate determined by how many system parameters of a predetermined kind are in the scan list.

3. The method of claim 1, wherein the portable subscriber unit uses a personal collapse value that is different from a system collapse value transmitted by the first messaging system, and wherein the initiating step further comprises the step of initiating background scanning at a rate determined by the personal collapse value.

4. The method of claim 1, wherein the portable subscriber unit is a two-way unit operating in a one-way mode, and wherein the initiating step comprises the step of initiating background scanning to find a more appropriate two-way system in the plurality of messaging systems.

5. The method of claim 1, wherein some of the plurality of system parameters are marked with a "no scan" indicator, and wherein the method further comprises, in the portable subscriber unit, the step of
negating background scanning when the first messaging system corresponds to a system parameter marked with the "no scan" indicator.

6. The method of claim 1, further comprising in the fixed portion or at least some of the plurality of messaging systems the step of
disallowing transmission, from the plurality of messaging systems, of a message addressed to the portable subscriber unit, during the plurality of exempted time perios defined for the portable subscriber unit.

7. The method of claim 1,
wherein a plurality of portable subscriber units operate in the plurality of messaging systems, and
wherein the initiating step comprises the steps of:
grouping the plurality of portable subscriber units into a plurality of groups; and
defining the plurality of exempted time periods to occur at different times in different ones of the plurality of groups.

8. The method of claim 1, further comprising the steps of:
programming the controller with predetermined information about the portable subscriber unit and about the scan list;
further programming the controller with a planned itinerary for a user of the portable subscriber unit; and
utilizing, by the controller, the plurality of system parameters and the planned itinerary to predict the upper bound for the channel search time and to reduce a replication of messages for the portable subscriber unit in multiple ones of the plurality of messaging systems when possible, following a change of location by the user as determined from the planned itinerary.

9. The method of claim 8, wherein the portable subscriber unit uses a personal collapse value that is different from a system collapse value transmitted by the first messaging system, and
wherein the controller has knowledge about the personal collapse value used by the portable subscriber unit, and
wherein the utilizing step comprises the step of
utilizing the personal collapse value to predict the upper bound for the channel search time and to stop the replication of messages.

10. A portable subscriber unit operating in a plurality of messaging systems for providing a predictable upper bound for a channel search time, the portable subscriber unit comprising:
a receiver for receiving messages and control information; and
a processing system coupled to the receiver for controlling the receiver and for processing the messages and control information,
wherein the processing system is programmed to:
select a first messaging system to monitor for messages;
initiate background scanning in accordance with a scan list, comprising a plurality of system parameters ranked by appropriateness for the portable subscriber unit, at a rate not slower than the rate established by a predetermined set of rules known to a controller which sends the messages to the portable subscriber unit, in an attempt to find a system identifier transmitted during a plurality of predetermined time periods, the system identifier identifying a second messaging system more appropriate for the portable subscriber unit than the first messaging system, the background scanning initiated during at least one of a plurality of exempted time periods coinciding with at least one of the plurality of predetermined time periods; and
concurrently monitor the first messaging system for receiving messages until identifying the second messaging system.

11. The portable subscriber unit of claim 10, wherein the processing system is further programmed to initiate background scanning at a rate determined by how many system parameters of a predetermined kind are in the scan list.

12. The portable subscriber unit of claim 10, wherein the processing system is further programmed to:
use a personal collapse value for the portable subscriber unit that is different from a system collapse value transmitted by the first messaging system, and
initiate background scanning at a rate determined by the personal collapse value.

13. The portable subscriber unit of claim 10, further comprising
a transmitter coupled to the processing system for transmitting messages and responses to a base receiver, and
wherein the processing system is further programmed to:
operate the portable subscriber unit in a one-way mode when the first messaging system does not support two-way communications; and
initiate background scanning to find a more appropriate two-way system in the plurality of messaging systems, in response to operating in the one-way mode.

14. The portable subscriber unit of claim 10,
wherein some of the plurality of system parameters are marked with a "no scan" indicator, and
wherein the processing system is further programmed to negate background scanning when the first messaging system corresponds to a system parameter marked with the "no scan" indicator.

15. A controller in a messaging system of a plurality of messaging systems for providing a predictable upper bound for a channel search time of a portable subscriber unit assigned to the controller, the controller comprising:
a network interface for receiving a message from a message originator and for conducting communications with others of the plurality of messaging systems;
a processing system coupled to the network interface for processing the message and the commnunications; and
a base station interface coupled to the processing system for controlling a base station,
wherein the processing system is programmed to control the base station to transmit, during a plurality of predetermined time periods, a system identifier, and
wherein the processing system is further programmed with information about a scan list in the portable subscriber unit, comprising a plurality of system parameters ranked by appropriateness for the portable subscriber unit, and with information defining for the portable subscriber unit a predetermined set of rules by which the portable subscriber unit initiates background scanning, and
wherein the processing system is further programmed to cooperate with others of the plurality of messaging systems, with regard to message delivery to the portable subscriber unit, in accordance with the information about said scan list and said predetermined set of rules, thereby providing said predictable upper bound for the channel search time, and wherein the processing system is further programmed with information defining for the portable subscriber unit a plurality of exempted time periods during which the portable subscriber unit is permitted to perform background scanning, in accordance with the scan list, for finding and selecting a system more appropriate for the portable subscriber unit than a currently monitored system, and wherein at least one of the plurality of exempted time periods coincides with at least one of the plurality of predetermined time periods.

16. The controller of claim 15, wherein the processing system is further programmed to disallow transmission of a message addressed to the portable subscriber unit, during the plurality of exempted time periods defined for the portable subscriber unit.

17. The controller of claim 15, wherein the processing system is further programmed with a planned itinerary for a user of the portable subscriber unit, and wherein the processing system is further programmed to utilize the information about the scan list, the plurality of exempted time periods, and the planned itinerary to predict the upper bound for the channel search time and to reduce a replication of messages for the portable subscriber unit in multiple ones of the plurality of messaging systems when possible, following a change of location by the user as determined from the planned itinerary.

18. The controller of claim 17, wherein the portable subscriber unit uses a personal collapse value that is different from a system collapse value transmitted by the currently monitored system, and wherein the processing system is further programmed with information about the personal collapse value used by the portable subscriber unit, and wherein the processing system is further programmed to utilize the personal collapse value to predict the upper bound for the channel search time for reducing the replication of messages.

* * * * *